United States Patent
Nozaki et al.

(10) Patent No.: US 6,938,378 B2
(45) Date of Patent: Sep. 6, 2005

(54) WEATHER STRIP FOR MOTOR VEHICLE

(75) Inventors: Masahiro Nozaki, Aichi-ken (JP); Shuji Nakano, Aichi-ken (JP)

(73) Assignee: Toyoda Gosei, Co., Ltd., Aichi-ken (JP)

(*) Notice: Subject to any disclaimer, the term of this patent is extended or adjusted under 35 U.S.C. 154(b) by 0 days.

(21) Appl. No.: 10/340,835

(22) Filed: Jan. 13, 2003

(65) Prior Publication Data
US 2003/0159358 A1 Aug. 28, 2003

(30) Foreign Application Priority Data
Jan. 15, 2002 (JP) .................................. 2002-005530

(51) Int. Cl.[7] ................................................ E06B 7/22
(52) U.S. Cl. ...................... 49/498.1; 49/495.1; 49/484.1
(58) Field of Search .............................. 49/475.1, 498.1, 49/495.1, 440, 441

(56) References Cited

U.S. PATENT DOCUMENTS

| 5,527,583 A | 6/1996 | Nozaki et al. |
| 5,590,926 A | 1/1997 | Nozaki |
| 5,791,722 A | 8/1998 | Nozaki et al. |
| 5,806,914 A | 9/1998 | Okada |
| 5,852,898 A | 12/1998 | Hikosaka et al. |
| 5,964,496 A * | 10/1999 | Nozaki et al. ........... 296/146.9 |
| 6,644,718 B2 * | 11/2003 | Nozaki .................... 296/146.9 |

FOREIGN PATENT DOCUMENTS

| JP | A-7-291056 | 11/1995 |
| JP | A-8-132882 | 5/1996 |

* cited by examiner

Primary Examiner—Jerry Redman
(74) Attorney, Agent, or Firm—Posz Law Group, PLC

(57) ABSTRACT

A weather strip for attachment along a side of a roof of a motor vehicle has a bottom portion to be attached to a door opening portion and a seal wall of which side ends are respectively connected to the bottom portion. The bottom portion and the seal wall define a tubular space of which the height is less than the width thereof. A widthwise inside half of the bottom portion is composed of a solid rubber, and is attached to the door opening portion via a base plate of a roof-side moulding. A widthwise outside half of the bottom portion and the seal wall are continuously formed of a sponge rubber. The widthwise outside half of the bottom portion serves as an extended part of the seal wall, and flexes along with the seal wall when the seal wall is pushed by a door glass upwardly, thereby sufficiently wrapping a peripheral edge of the door glass.

9 Claims, 3 Drawing Sheets

WEATHER STRIP FOR MOTOR VEHICLE

CROSS-REFERENCE OF RELATED APPLICATION

This application is related to and claims priority from Japanese patent application No. 2002-005530, incorporated herein by reference.

BACKGROUND OF THE INVENTION

1. Field of the Invention

The present invention relates to a weather strip for a motor vehicle and, more particularly, to a weather strip to be attached to a door opening portion along a side of a roof of a motor vehicle.

2. Description of Related Art

In a hardtop-type motor vehicle shown in FIG. 1, a weather strip 10 is attached to a door opening portion 12 along a side of a roof 14, which ranges from a front pillar 16 to a rear pillar 18. In FIG. 1, reference numeral 20 designates a door glass.

Generally, the weather strip of this type is composed of an extruded body of an elastic material such as rubber or thermoplastic elastomer, and includes a thick base portion and a tubular seal portion which has a seal wall defining a tubular space. Publication of unexamined Japanese patent application No. Hei5-213119 discloses one example of the weather strip of this type. In this example, a retainer is provided along the door opening portion, and the weather strip is attached by fitting the thick base portion in the retainer.

It has been demanded to reduce the protrusion height of the weather strip from the door opening portion, thereby improving the view from a vehicle window. In order to respond to this demand, as shown in FIG. 2 and as disclosed in the above publication, there has been proposed a weather strip 10A which has a tubular configuration, and is entirely composed of a sponge material. Upon attaching, a bottom portion 22 of the weather strip 10A is bonded to a retainer 24 provided along the door opening portion 12 with a double-sided adhesive tape 26.

The protrusion height of the weather strip 10A can be reduced, as compared to the conventional weather strip of which a thick base portion is fitted in the retainer. The weather strip 10A, however, exhibits the problem that, upon bonding, the bottom portion 22 may be offset from a predetermined bonding position, whereby the weather strip 10A may be attached in a meandering state, and a resultant seal between the weather strip 10A and the door opening portion 12 becomes instable.

In order to ensure the attaching stability of the weather strip, as shown in FIG. 3, there has been proposed another weather strip 10B which has a tubular configuration, and includes a bottom portion 28 composed of a solid rubber, and a seal wall 30 composed of a sponge rubber. A groove 34 is formed in the bottom portion 28. A roof-side moulding 32 is secured to the door opening portion 12. A base plate 38 of the roof-side moulding 32 has a projection 36 along an inside end thereof. The weather strip 10B is attached to the door opening portion 12 by fitting the groove 34 of the bottom portion 28 onto the projection 36 (Publication of unexamined Japanese patent application No. Hei7-291056).

With this attaching structure, the weather strip 10B can be positioned and attached in a predetermined attaching position. In order to further improve the attaching stability of the weather strip 10B, the bottom portion 28 may be bonded to the base plate 38 with a double-sided adhesive tape 40. In this case, before bonding the bottom portion 28, the groove 34 is previously positioned onto the projection 36 of the roof side moulding 32. Accordingly, the weather strip 10B can be attached in a predetermined position of the door opening portion 12 more accurately.

The weather strip 10B, however, exhibits the following problem. Where the protrusion height of the weather strip 10B is reduced to improve the view from a vehicle window, the widthwise length of the seal wall 30 of which side ends are respectively connected to side ends of the bottom portion 28 becomes short. When the door glass 20 is raised, and a peripheral edge thereof pushes the short seal wall 30 upwardly, a tension force is generated therein. Consequently, as shown in FIG. 4, a space S is formed between each side of a peripheral edge of the door glass 20 and the seal wall 30 so that, as shown by solid lines, the seal wall 30 does not sufficiently wrap the peripheral edge of the door glass 20. This results in the contacting area of the seal wall 30 against the peripheral edge of the door glass 20 decreasing, and the water-stopping properties and sound-insulating properties degrading.

SUMMARY OF THE INVENTION

Accordingly, it is an object of the present invention to provide a weather strip for attachment to a door opening portion of a motor vehicle, of which the protrusion height from the door opening portion can be decreased while maintaining excellent sealing properties, thereby improving the view from a door window of the motor vehicle.

It is another object of the present invention to provide a weather strip which can be attached to the door opening portion with good attaching accuracy.

The weather strip in accordance with the present invention is composed of an elastic body, and includes a bottom portion to be attached to a weather strip attaching surface along a door opening portion, and a seal wall of which side ends are respectively connected to the bottom portion to define a tubular space. The seal wall is to be pushed by a peripheral edge of a door glass raised to a fully closed position. The bottom portion has a width corresponding to that of the weather strip attaching surface. A widthwise inside half of the bottom portion is formed of a solid material, and a widthwise outside half of the bottom portion and the seal wall are continuously formed of a sponge material. The widthwise inside half of the bottom portion has an engaging part for engagement with the weather strip attaching surface.

Since the widthwise outside half of the bottom portion is composed of a sponge material, and is continuously formed with the seal wall, the widthwise outside half of the bottom portion serves to flex the seal wall when the seal wall is pushed by the door glass upwardly. This results in that, even when the protrusion height of the weather strip is reduced to decrease the widthwise length of the seal wall, the peripheral edge of the door glass is sufficiently wrapped and sealed with the seal wall.

It is preferable that the engaging part is composed of a groove formed in the inside half of the bottom portion. Upon attaching the weather strip, the groove of the bottom portion is engaged with a projection formed in an inside end of the weather strip attaching surface.

It is also preferable that the engaging part is composed of a projection formed in an inside end of the bottom portion so as to project inwardly. Upon attaching the weather strip, the projection of the bottom portion is engaged with a groove formed in an outside surface of an opening trim which is attached along the door opening portion inside the weather strip.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Figure 1:
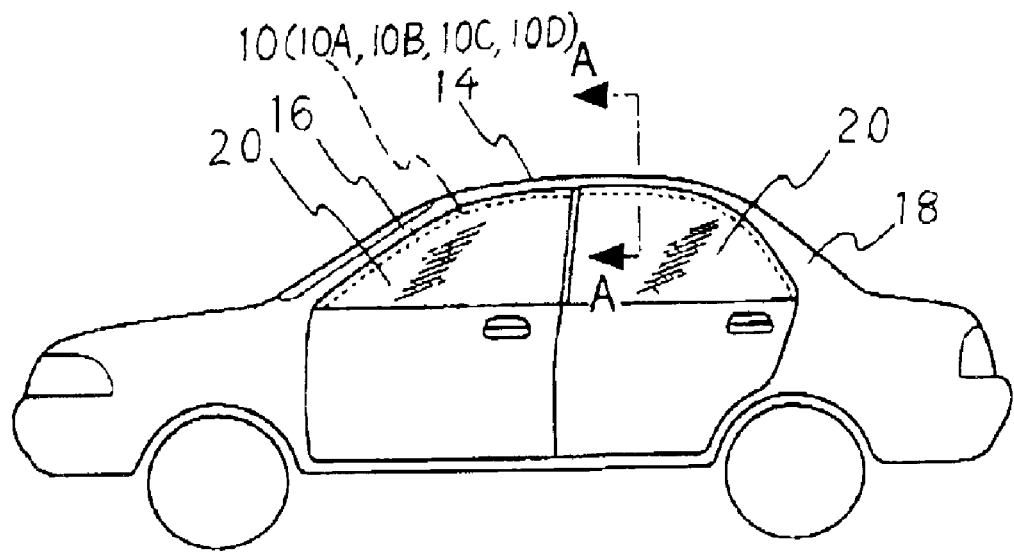
FIG. 1 is a side view of a motor vehicle wherein a weather strip is attached along a side of a roof of a motor vehicle.
Figure 2:
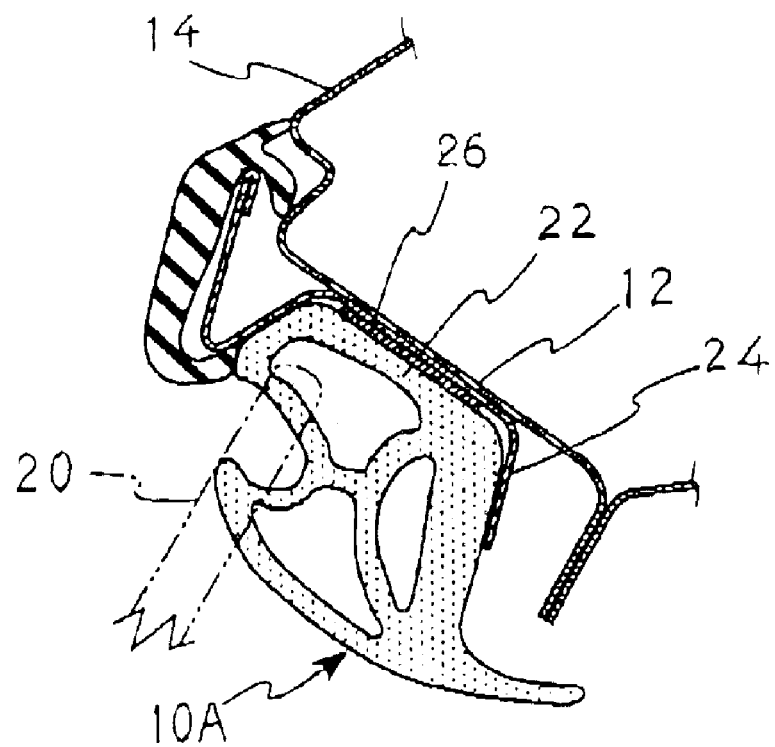
FIG. 2 is a cross-sectional view of one of conventional weather strips, which is taken along the line A—A of FIG. 1.
Figure 3:
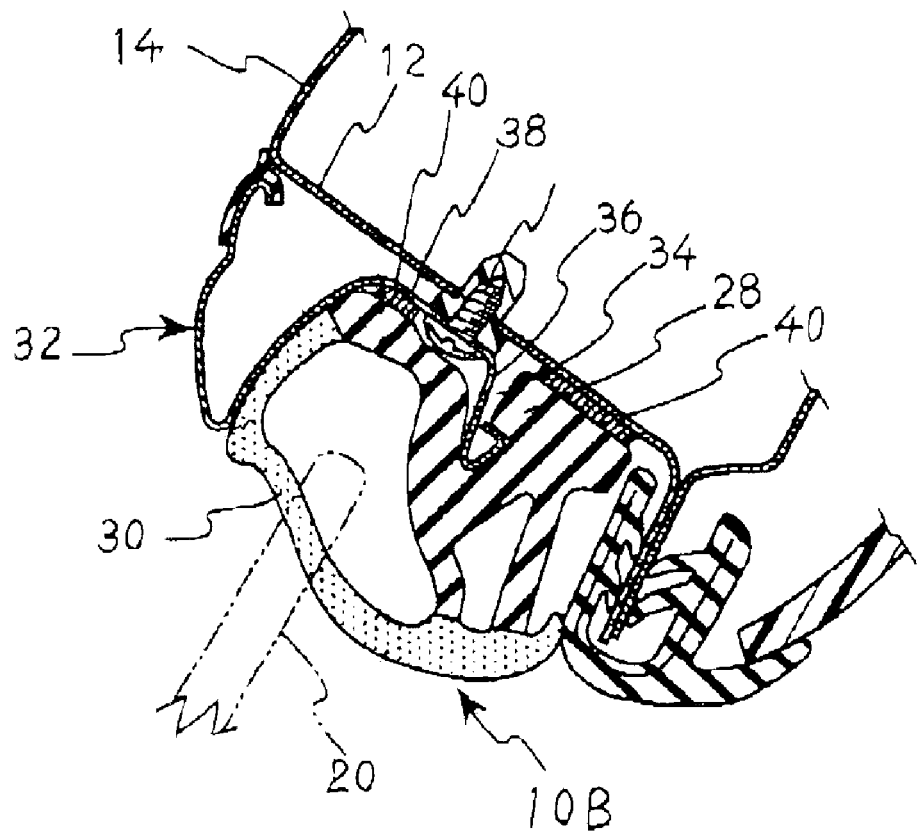
FIG. 3 is a cross-sectional view of another conventional weather strip, which is taken along the line A—A of FIG. 1.
Figure 4:
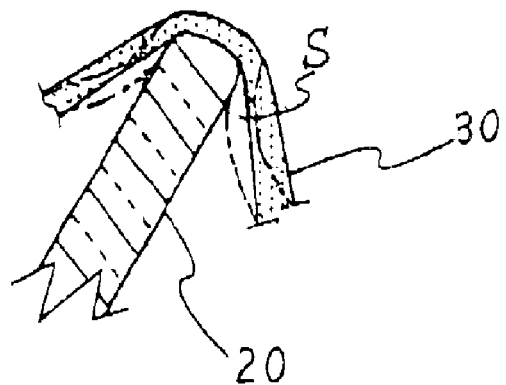
FIG. 4 is a view showing one problem of the conventional weather strip of FIG. 3.
Figure 5:
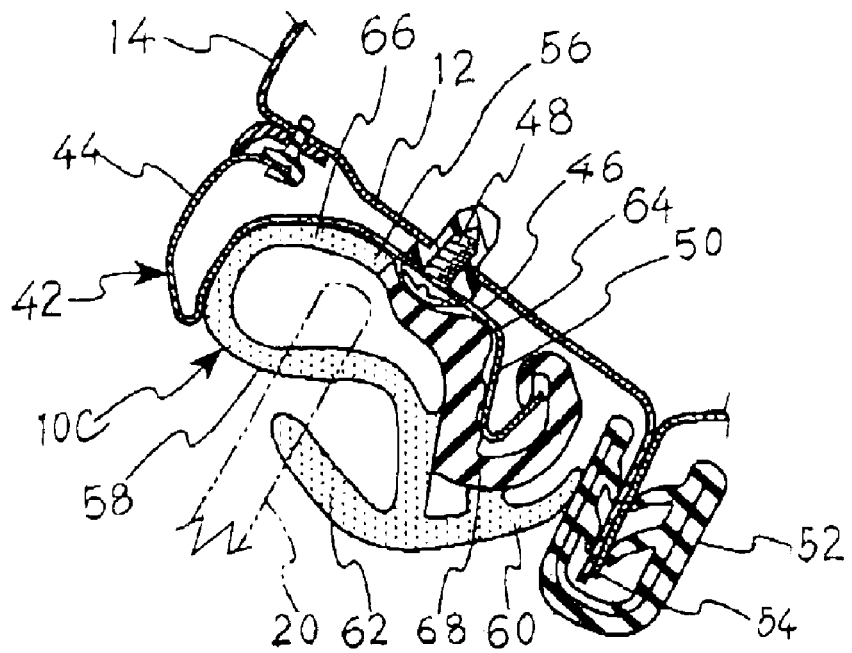
FIG. 5 is a cross-sectional view of one embodiment of a weather strip in accordance with the present invention, which is taken along the line A—A of FIG. 1.

FIG. 5 shows one embodiment of a weather strip in accordance with the present invention. As shown, a weather strip 10C is attached to a door opening portion 12 along a side of a roof 14, which ranges from a front pillar 16 to a rear pillar 18 of a vehicle body (FIG. 1) using a roof side moulding 42.

The roof-side moulding 42 is composed of a metallic plate, and includes a main body 44 which covers an outside surface of the weather strip 10C, and a base plate 46 which extends from the main body 44. The base plate 46 is placed under the door opening portion 12, and secured thereto with screws 48 in about a widthwise center thereof, thereby providing a weather strip attaching surface. The base plate 46 has a projection 50 which projects from an inside end thereof away from the door opening portion 12 and then turns back towards the door opening portion 12. An opening trim 52 having a generally U-shaped cross-section is attached to a flange 54 which is provided along an inside end of the door opening portion 12.

The weather strip 10C is composed of an extruded body of EPDM rubber, and includes a bottom portion 56 and a seal wall 58 of which side ends are respectively connected to the bottom portion 56 to define a tubular space having a generally elliptic cross-section of which the height is less than the width of the bottom portion 56. The bottom portion 56 has a width substantially identical to that of the base plate 46. Seal lips 60 and 62 respectively project from a connecting portion between an inside end of the bottom portion 56 and the seal wall 58 inwardly and outwardly. A widthwise inside half 64 of the bottom portion 56 is composed of a solid EPDM rubber while a widthwise outside half 66 of the bottom portion 56, the seal wall 58, and the seal lips 60 and 62 are composed of a sponge EPDM rubber. A groove 68 as an engaging part is defined by an inside end part of the inside half 64, which has a generally U-shaped cross-section. The seal wall 58 and the outside half 66 of the bottom portion 56 are continuously formed with a substantially identical thickness. The inside end part of the inside half 64 of the bottom portion 56, which defines the groove 68, is formed thick, as compared to the remaining portion of the weather strip 10C.

Upon attaching the weather strip 10C to the door opening portion 12, the bottom portion 56 of the weather strip 10C is fitted in the weather strip attaching surface of the base plate 64 of the roof-side moulding 42, and the groove 68 of the bottom portion 56 is engaged with the projection 50 of the base plate 64 of the roof-side moulding 42. In the attached state, the seal wall 58 extends downwardly while curving gently along an inside surface of the main body 44 of the roof-side moulding 42, further extends inwardly while facing the bottom portion 56 with a spacing, approaches an inside end of the widthwise inside half 64 of the bottom portion 56, and is connected thereto. And the seal lip 60 abuts an outside surface of the opening trim 52 which is attached to the flange 54.

With this arrangement, the inside end part of the bottom portion 56, which defines the engaging part 68, is made thick, whereby the attaching stability of the weather strip 10C is ensured.

In the present embodiment, the seal wall 58 has the configuration which does not greatly expand from the bottom portion 56 so that the widthwise length thereof is not sufficient for sealing around the peripheral edge of the door glass 20. But, since the outside half 66 of the bottom portion 56 is composed of a sponge EPDM rubber, and formed continuously with the seal wall 58, the outside half 66 serves as a seal wall which is continuous with the seal wall 58.

Consequently, when the seal wall 58 is pushed by the door glass 20 upwardly, tension force is scarcely generated in the seal wall 58, whereby the peripheral edge of the door glass 20 is sufficiently wrapped with the seal wall 58 to ensure the water-stopping properties and noise-insulating properties between the seal wall 58 and the door glass 20 preferably.

Figure 6:
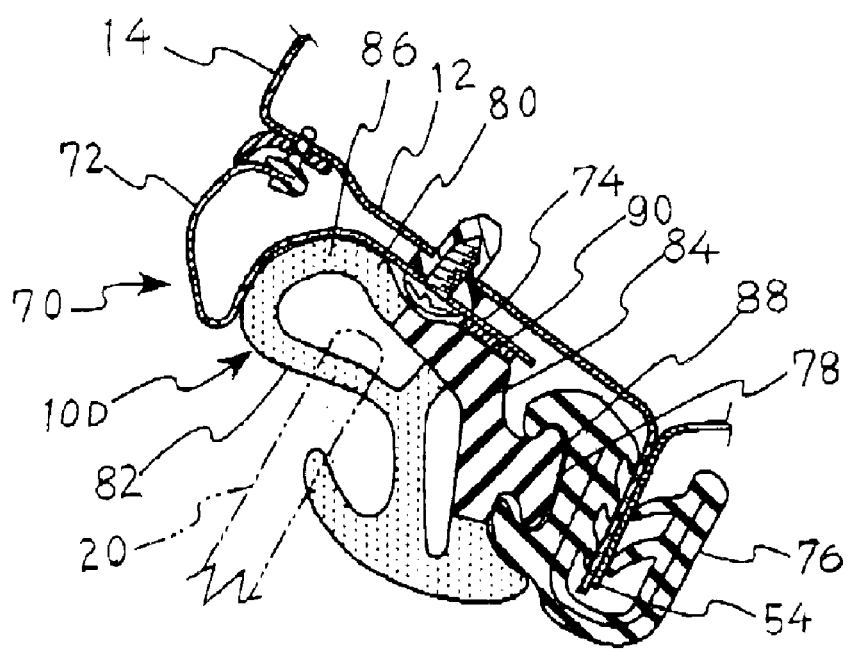
FIG. 6 is a cross-sectional view of another embodiment of a weather strip in accordance with the present invention, which is taken along the line A—A of FIG. 1.

FIG.6 shows another embodiment of the present invention. As shown, a roof-side moulding 70 has a main body 72 and a base plate 74 which extends from the main body 72. No projection is formed along an inside end of the base plate 74. An opening trim 76 is attached to a flange 54 provided along an inside end of the door opening portion 12. A groove 78 is formed in an outside surface of the opening trim 76. The groove 78 has a C-shaped cross-section and opens outwardly.

A weather strip 10D includes a bottom portion 80 and a seal wall 82. A widthwise inside half 84 of the bottom portion 80 is composed of a solid EPDM rubber while a widthwise outside half 86 of the bottom portion 80 and a seal wall 82 are composed of a sponge EPDM rubber. An inside end part of the inside half 84 of the bottom portion 80 is formed thick and has an engaging projection 88 which projects toward the groove 78 of the trim 76. The engaging projection 88 has an outer surface curving into a letter C-shaped configuration which conforms to the groove 78 of the trim 76.

The weather strip 10D thus arranged is attached to the door opening portion 12 by press-inserting the engaging projection 88 of the bottom portion 80 in the groove 78 of the opening trim 76, and bonding the inside half 84 of the bottom portion 80 to the base plate 74 with a double-sided adhesive tape 90.

The remaining structure of the present embodiment is substantially identical to that of the preceding embodiment. The present embodiment can achieve the operational advantages similar to those of the preceding embodiment.

Furthermore, the weather strip may be attached to the door opening portion of the vehicle body with other attaching structures. For example, a flange is formed along an inside end of a base plate of a roof-side moulding so as to project downwardly and face an outside surface of an opening trim, and a projection is formed in an inside end part of a bottom portion of the weather strip so as to project upwardly therefrom. By press-inserting the projection of the weather strip into a space between the flange of the roof-side moulding and the outside surface of the opening trim upwardly, the weather strip can be attached to the door opening portion.

With the weather strip in accordance with the present invention, the widthwise outside half of the bottom portion is composed of a sponge material continuously with the seal wall. Thus, the widthwise outside half of the bottom portion defines an extended part of the seal wall. Accordingly, where the protrusion height of the weather strip is reduced, and the widthwise length of the seal wall itself decreases, by virtue of the widthwise outside half of the bottom portion, the peripheral edge of the door glass can be sufficiently wrapped with the seal wall, thereby ensuring good sealing properties thereagainst.

In addition, by virtue of the widthwise inside half of the bottom portion, the weather strip can be stably attached to the door opening portion.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A weather strip, which is composed of an elastic material, for attachment to a door opening portion along a side of a roof of a motor vehicle, the weather strip comprising:
    a bottom portion to be attached to a weather strip attaching surface, which is provided along door opening portion, said bottom portion having a width corresponding to that of said weather strip attaching surface, said weather strip attaching surface being composed of a base plate of a roof-side moulding, which is placed under the door opening portion and secured to the door opening portion; and
    a seal wall of which side ends are respectively connected to said bottom portion to define a tubular space having a generally elliptical cross-section of which the height is less than the width of said bottom portion, said seal wall extending downwardly in a smooth curved shape, further extending inwardly and facing said bottom portion with spacing, wherein the seal wall is capable of being pushed by a peripheral edge of a door glass that is raised to a fully closed position, wherein a first widthwise section of said bottom portion, which is located at an inner side of the bottom portion, composed of a solid material, and a second widthwise section of said bottom portion, which is located at an outer side of the bottom portion, and said seal wall are continuously composed of a sponge material, said second widthwise section of said bottom portion having a thickness that is approximately identical to that of said seal wall, wherein said second widthwise section extends along an outer section of said base plate of said roof-side moulding to be continuous with said seal wall and said first widthwise section of said bottom portion an has engaging part that forms an interlocking engagement with an inner portion of said base plate of said roof-side moulding.

2. A weather strip as claimed in claim 1, further comprising a seal lip that projects outwardly from a connecting portion between an inside end of said first widthwise section of said bottom portion and said seal wall.

3. A weather ship as claimed in claim 1, wherein said seal wall is constructed and arranged to be pushed by a peripheral edge of a door glass that is raised to a fully closed position such that the seal wall wraps around the peripheral edge of the door glass.

4. A weather strip as claimed in claim 1, wherein an inner portion of said second widthwise section, in the vicinity of an outer end of said first widthwise section, is constructed and arranged to extend in a direction that is substantially perpendicular to a plane of the window glass.

5. A weather strip that is formed from an elastic material wherein the weather strip comprises:
    a bottom portion to be attached to a weather strip attaching surface provided along a door opening portion, said bottom portion having a width corresponding to that of said weather strip attaching surface, said weather strip attaching surface being composed of a base plate of a roof-side moulding, which includes a main body that covers an outside surface of said weather strip, said base plate extending from said main body and being placed under the door opening portion and secured thereto; and
    a seal wall of which side ends are respectively connected to said bottom portion to define a tubular space, wherein said seal wall is capable of being pushed by a peripheral edge of a door glass raised to a fully closed position, wherein a first widthwise section of said bottom portion, which is located at an inner side of the bottom portion, is composed of a solid material, and a second widthwise section of said bottom portion, which is located at an outer side of the bottom portion, and said seal wall are continuously composed of a sponge material, and the first widthwise section of said bottom portion has an engaging part that engages with said weather strip attaching surface,
    wherein said engaging part is composed of a groove defined by an inside end part having a U-shaped cross-section, said groove being engaged with a projection formed in an inside end of said base plate of said roof-side moulding.

6. A weather strip as claimed in claim 5, wherein said first widthwise section of said bottom portion is bonded to said base plate of said roof-side moulding with a double-sided adhesive tape.

7. A weather strip that is formed from an elastic material and that is for attachment to a door opening portion along a side of a roof of a motor vehicle, comprising:
    a bottom portion to be attached to a weather strip attaching surface, which is provided along a door opening portion, said bottom portion having a width corresponding to that of said weather strip attaching surface, said weather strip attaching surface being composed of a base plate of a roof-side moulding which includes a main body for covering an outside surface of said weather strip, said base plate extending from said main body and being placed under the door opening portion and secured thereto; and
    a seal wall of which side ends are respectively connected to said bottom portion to define a tubular space, wherein the seal wall is capable of being pushed by a peripheral edge of a door glass which is raised to a fully closed position, wherein a first widthwise section of said bottom portion, which is located at an inner side of the bottom portion, is composed of a solid material, and a second widthwise section of said bottom portion, which is located at an outer side of the bottom portion, and said seal wall are continuously composed of a sponge material, said first widthwise section of said bottom portion having an engaging part for engagement with said weather strip attaching surface, wherein said engaging part is composed of a projection formed in an inside end part of said bottom portion so as to project inwardly, said projection being engaged with a groove formed in an outside surface of an opening trim, which is attached along the door opening portion inside said weather strip.

8. A weather strip as claimed in claim 7, wherein the groove has a C-shaped cross-section and opens outwardly.

9. A weather strip as claimed in claim 7, wherein the first widthwise section of the bottom portion is bonded to the base plate with a double-sided adhesive tape.

* * * * *